(No Model.)
G. L. WITSIL.
SANDWICHED BREAD.
No. 248,247. Patented Oct. 11, 1881.
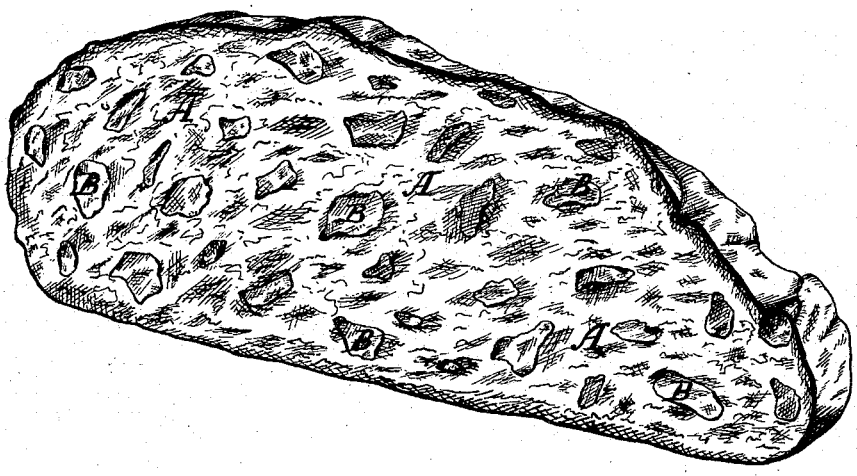
Attests:
J. H. Templin.
Inventor.
George L. Witsil,
By his Attorneys,
W. C. Strawbridge
Bonsall Taylor.

UNITED STATES PATENT OFFICE.

GEORGE L. WITSIL, OF PHILADELPHIA, PENNSYLVANIA, ASSIGNOR, BY DIRECT AND MESNE ASSIGNMENTS, TO ALFRED MARTIEN AND JOHN JOLLEY, JR., BOTH OF SAME PLACE.

SANDWICHED BREAD.

SPECIFICATION forming part of Letters Patent No. 248,247, dated October 11, 1881.

Application filed January 8, 1881. (No specimens.)

*To all whom it may concern:*

Be it known that I, GEORGE L. WITSIL, of Philadelphia, Pennsylvania, have invented a novel and useful article of manufacture, which I term "Sandwiched Bread," of which the following is a specification.

My invention relates to the arts of bread making and baking, and has for its object the provision of a ready-made sandwich, so to speak, in the form of a loaf, slice, or mold of bread charged throughout with pieces of meat.

Heretofore, as is well known, sandwiches have been composed of two slices or layers of bread inclosing between them a slice of meat.

My invention consists in a form of sandwich or bread in which the meat exists in pieces embedded in the bread—that is to say, commingled or otherwise intimately associated with the dough and baked together therewith.

The drawing represents, in perspective, a slice cut from a loaf of this sandwiched bread.

A is the dough and B the pieces of meat.

The advantages incident to the article are that the bread will not get stale, but will retain the flavor of the meat; and while the juices of the meat are preserved that its fatty matters will pass into and throughout the bread, so as to keep the latter moist.

I find the following to be a convenient method of making the article: Meat cut to pieces of the size above described is placed in its raw state with dough, and, by any process of kneading or the like, distributed and commingled throughout the dough, much in the manner that plums, for instance, are distributed throughout a pudding. The charged dough is then shaped by hand or mold to the desired form and baked or otherwise cooked in the usual manner. By the process of cooking not only the dough but the meat is sufficiently baked to make the dough bread and to preserve the juices of the meat, while, in addition to the preservative action of the heat upon the dough, the fat which is driven off the meat into the dough serves to keep the latter moist and fresh.

The uses of the article for the provisioning of navies and armies, for travelers, laborers, and excursionists are obvious.

Having thus described my invention, I claim and desire to secure by Letters Patent of the United States—

As a new article of manufacture, sandwiched-bread, or bread containing pieces of meat, which have been distributed in a raw condition throughout the dough of which the bread is composed and have been cooked at the same time therewith, substantially as hereinbefore set forth.

In testimony whereof I have hereunto signed my name this 6th day of January, 1881.

GEO. L. WITSIL.

In presence of—
J. BONSALL TAYLOR,
CHARLES P. TASKER.